Nov. 25, 1930.        C. A. HILL        1,783,088
METHOD OF AND APPARATUS FOR RESHAPING DEFORMED PIPE ENDS
Filed July 27, 1929
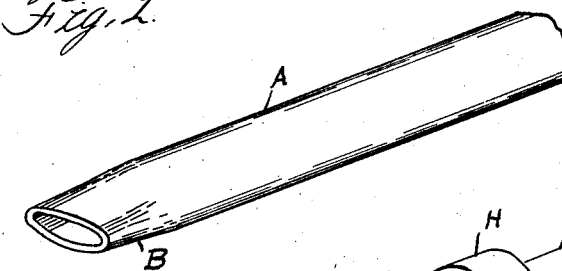
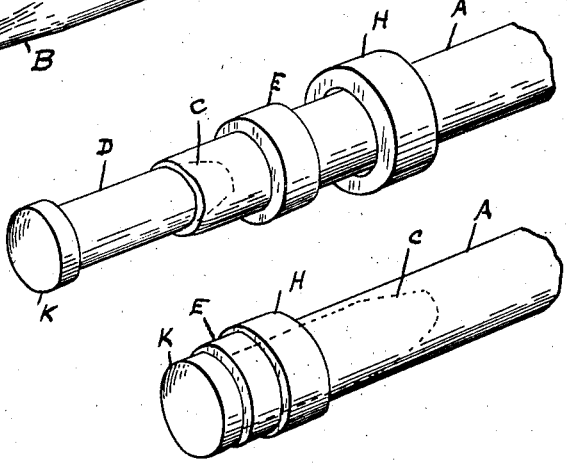
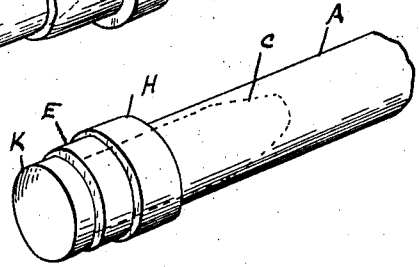
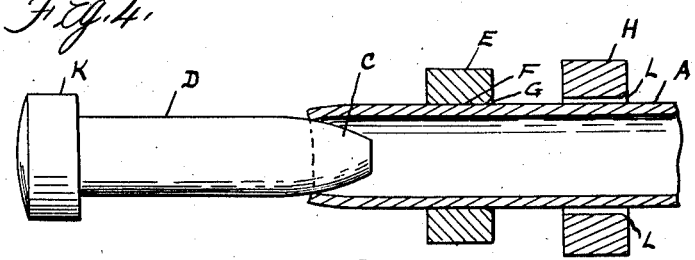
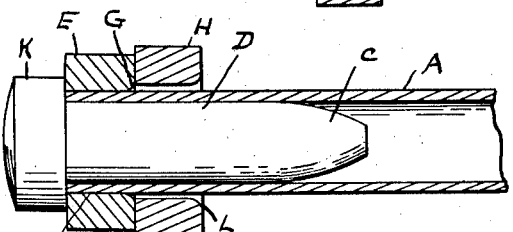
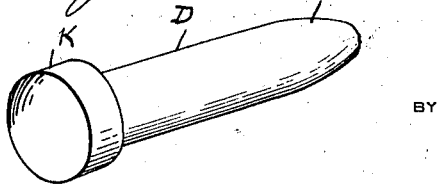
INVENTOR
Charles A. Hill
BY
Swan and Fry
ATTORNEYS Patented Nov. 25, 1930

1,783,088

UNITED STATES PATENT OFFICE

CHARLES A. HILL, OF PORT HURON, MICHIGAN, ASSIGNOR TO MUELLER BRASS CO., OF PORT HURON, MICHIGAN, A CORPORATION OF MICHIGAN

METHOD OF AND APPARATUS FOR RESHAPING DEFORMED PIPE ENDS

Application filed July 27, 1929. Serial No. 381,445.

This invention relates to the reshaping and sizing of terminally deformed pipes or tubes, and apparatus therefor. Among the several objects of the invention may be noted the provision of means for effecting restoration to availability of pipes, tubes and the like which have been flattened or otherwise deformed, as a preferable alternative to discarding such sections as scrap, only fit for remelting. The invention is particularly applicable to relatively soft walled piping, such as copper piping, which is easily susceptible to deformation or abrasion, and almost equally susceptible to restoration to a condition of unimpaired utility when treated in the manner herein described. My invention is also adapted for convenient use in effecting the expansion to a desired increased diameter, or sizing, of a pipe.

The invention accordingly comprises the elements and combination of elements, features of construction, and arangement of parts which will be exemplified in the structure hereinafter described, and the scope of the application of which will be indicated in the following claims.

In the accompanying drawings, in which is illustrated one of various possible embodiments of the invention, Figure 1 is a perspective view of a terminally deformed pipe or tube section;

Figure 2 is a perspective view similar to Figure 1, showing the first step in my reshaping process.

Figure 3 is a perspective view showing the positioning of the operative parts on the tube at the end of the reshaping process.

Figure 4 is a side elevation, partly in section, of the tube and the operative parts in a position generally corresponding to that shown in Figure 2;

Figure 5 is a sectional view similar to Figure 4, showing a male or plug member fully driven into operative position, and with an expelling ring ready to be moved against the female member or forming ring; and Figure 6 is a perspective view of a preferred form of a male or expanding member.

Similar reference characters indicate corresponding parts throughout the several views of the drawings.

Referring now more particularly to Figure 1, index character A indicates a pipe end which has been flattened or deformed from normal circular cross-section by bending, impact, rough handling, or the like. Depending upon the degree to which the walls of the tubing have thus been deformed, a more or less pointed or tapering end C of a male or expanding tool or member D can be inserted into the space still remaining between the collapsed walls of the tube sufficiently to expand them somewhat. However, even if this expanding is sufficient to enable the rounded body portion of the entering tool D to fully engage in the end of the pipe the pipe end will be found still to be somewhat deformed and out of true alignment with the rest of the pipe or tube. To obtain a complete return to circular or normal cross-section both externally and internally, I slip over the end of the deformed tube a female member or encircling forming ring E which preferably has a true cylindrical opening therein, as indicated at F. The cylindrical opening, which is in diameter equivalent to the desired external diameter of the deformed tube, is preferably beveled or outwardly tapered so as to facilitate slipping on to the end of the deformed tube or pipe. I also slip over the end of the pipe in advance of the female member or forming ring E a second removal ring H, which is of appreciably larger internal diameter than the desired external diameter of the tube end so that it will at all times slip readily on said tube. The bore of this latter ring H is generally straight, except at its entering end L, which is preferably internally bevelled or tapered similarly to the female member or E, at the indicated point G, thereby to facilitate slipping of the ring H over the deformed pipe end.

After the member E and ring F are in place upon the deformed tube, the male member D is driven by impact or otherwise into the deformed end of the tube until its shoulder or head portion K abuts the end of said tube and the outer face of the female member E. The ductility of the walls of the tube enables this operation to be performed with ease, and, as a result, the deformed tube is restored to the desired normal cross-section as determined, internally by the male member D, and externally by the female member E. This reshaping extends along the tube a distance determined by the axial lengths of the male and female members D and E respectively.

The insertion of the male member D, however, has resulted in so tight a fit of the parts that its removal from the reshaped tube end can be practically effected only by hammering against the shoulder K of the male member D in a manner that might frequently result in abrasion and redeformation of the tube. To avoid such deformation, the ring H is now brought into play, and by manually induced lengthwise blows against the female member E, impact pressure is brought to bear upon said member E and the engaging shoulder K of the male member D. Repeated blows thus effected results in the removal from the tube of both the male and female members D and E. Since the force of each impact is distributed evenly about the edge of the female member E, abrasion and deformation of the tube is prevented.

The internal diameter of the ejection ring H may be varied, so long as it is not greater than the external diameter of the female member E, in order that engaging shoulders are obtained.

My improved apparatus can also be made use of to size, or expand or contract the tube, deformed or not, within its limits of ductility. Such an expansion or contraction is controlled by the external diameter of the male member D and the internal diameter of the female member E. It is noted that the removing or ejection ring H should in all cases, however, have an internal diameter appreciably greater than the desired external diameter of the tube, so that said ring H will slip readily on said tube.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. Apparatus for reshaping tube ends which comprises means for compressing said tube ends to the desired interior and exterior diameter, and means for removing said compressing means from said tube end comprising a longitudinally movable ring.

2. The process of reshaping terminally deformed tubes comprising first effecting a partial restoration, positioning on said tubes two rings of different diameters, the smaller of said rings being of sufficient internal diameter to overengage the tube and be positioned accurately over the end thereof, the other of said rings being loosely movable along said tube and at first positioned toward the intermediate portion of said tube, inserting a male member into the partially reshaped tube end and driving the same thereinto until the deformed wall portion thereof is tightly compressed in restored circular form between said male member and the inner surface of the first-named ring, and thereafter driving the entering member and the smaller first-named ring from said tube by repeatedly impacting said movable ring against said smaller ring.

3. The method of restoring to its initial cross-sectional contour the deformed end of a tube, comprising initially slipping over said tube a pair of rings of different internal diameters, the smaller of said rings being adapted to engage relatively closely about the deformed tube end, inserting in the deformed tube end a male member until the tube walls thus interposed between the outer surface of the male member and the inner surface of said smaller ring are shaped to the desired contour, and thereafter effecting the release of said smaller ring and said male member from said tube end by impacting said larger ring against said smaller ring.

4. The method of expanding the end of a pipe section, which comprises positioning thereover a plurality of rings of diverse internal diameter, one of which rings is of appreciably greater diameter than the desired external size of the pipe and another of which rings is of substantially the same internal diameter as the desired external diameter of the pipe, inserting a male member into the pipe end to effect the expansion thereof against the internal surface of the last-named ring, and thereafter effecting the release of said last-named ring by repeated impact of the first-named ring against the adjacent end of said last-named ring.

5. Apparatus for effecting the reshaping of terminally deformed tubes comprising a pair of ring members of different internal diameter, one of which rings is adapted to fit tightly about the end of the tube in its desired diameter and the other of which rings is loosely slidable therealong, and an entering member whose cross-section is substantially the desired internal diameter of the pipe.

6. In a tube-reshaping mechanism, in combination, a ring member adapted to be positioned loosely about the end of a deformed tube, a female member, having an internal diameter substantially equal to the desired exterior diameter of the tube as reshaped, and a male member of substantially the same diameter as the desired internal diameter of the tube as reshaped.

7. The combination, with a pair of ring members of different internal diameter, the larger of which ring member is adapted to slide loosely on a tube, the smaller of which ring members is of substantially the same internal diameter as the desired external diameter of said tube, of an entering member of substantially the same diameter as the desired internal diameter of said tube.

8. In a tube-reshaping mechanism, a male member of substantially the same external contour as the desired internal contour of the reshaped tube, a female member of substantially the same internal contour as the intended external contour of the reshaped tube, and a ring having an internal contour greater than the internal contour of said female member adapted, under conditions of movement lengthwise of the tube, to effect a removal of said female member and of said male member from said tube.

In testimony whereof I sign this specification.

CHARLES A. HILL.